(12) United States Patent
Nakazawa

(10) Patent No.: US 7,852,518 B2
(45) Date of Patent: Dec. 14, 2010

(54) IMAGE INPUTTING APPARATUS

(75) Inventor: Kazuo Nakazawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1593 days.

(21) Appl. No.: 11/018,256

(22) Filed: Dec. 22, 2004

(65) Prior Publication Data

US 2005/0141043 A1   Jun. 30, 2005

(30) Foreign Application Priority Data

Dec. 25, 2003   (JP) .............................. 2003-428720

(51) Int. Cl.
*H04N 1/04* (2006.01)

(52) U.S. Cl. .................. 358/444; 358/445; 358/448; 358/474

(58) Field of Classification Search .................. 358/444, 358/445, 448, 474
See application file for complete search history.

(56) References Cited

U.S. PATENT DOCUMENTS

RE39,213 E * 8/2006 Anderson et al. ...... 348/231.99

2001/0052994 A1   12/2001   Murata
2002/0033970 A1   3/2002   Chen
2002/0051259 A1 *  5/2002   Yasunobu .................. 358/518

FOREIGN PATENT DOCUMENTS

EP        0 830 000 A2   3/1998
JP        2002-010025    1/2002

* cited by examiner

*Primary Examiner*—Houshang Safaipour
(74) *Attorney, Agent, or Firm*—Rabin & Berdo, P.C.

(57) ABSTRACT

An image inputting apparatus has an image reading device and a storage medium that can be removably loaded into the image reading device, and a controller that causes the storage medium to store image data read through the image reading device. The apparatus includes an image analyzing section and a data converting section. The image analyzing section analyzes image format information previously stored in the storage medium. The data converting section converts the image data read through the image reading device, conversion being performed based on an analysis result of the image analyzing section. The controller causes the storage medium to store the image data read through the image reading device. The image format information includes a file format, the number of colors, the size of image, and the type of primary colors.

6 Claims, 6 Drawing Sheets

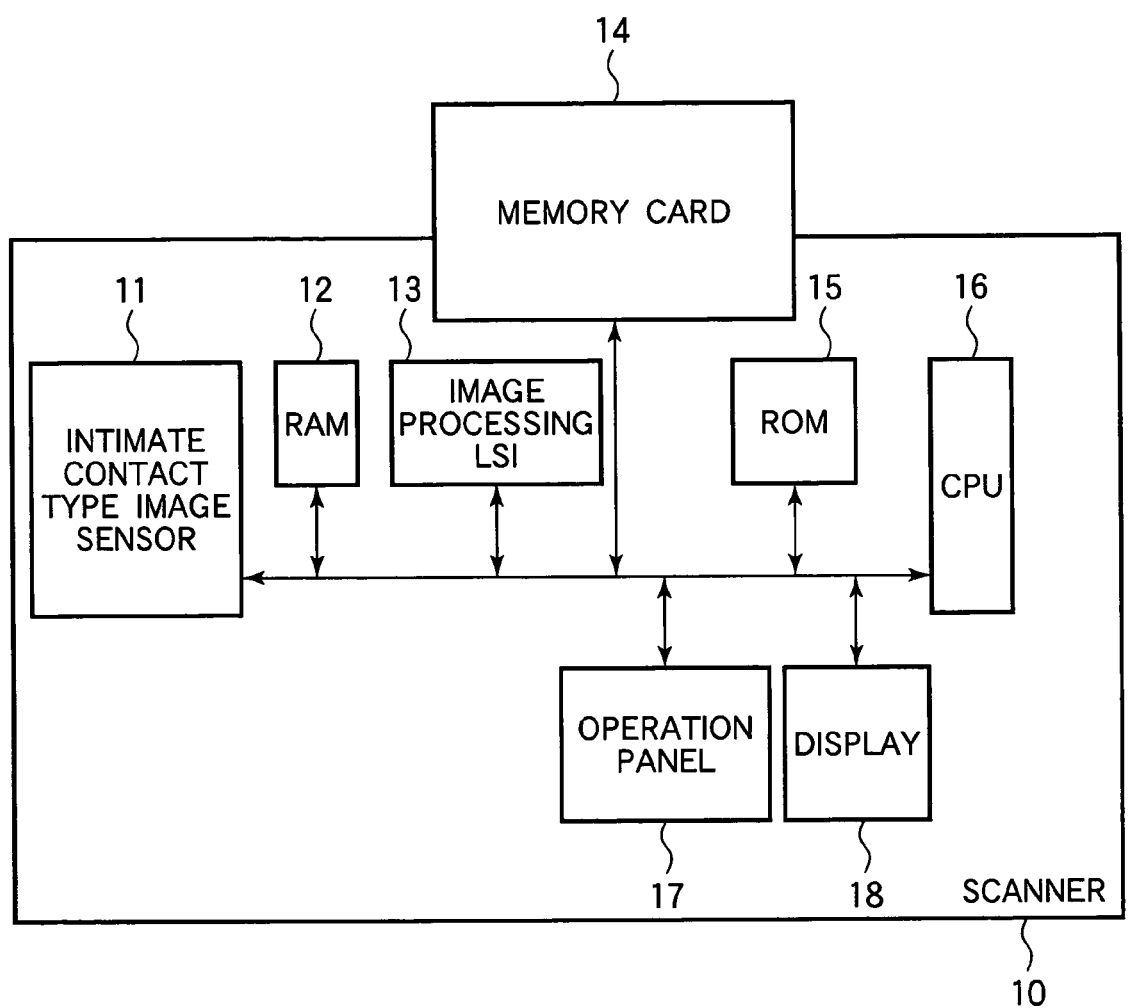

IMAGE INPUTTING APPARATUS

BACKGROUND OF THE INVENTION

1. Field of the Invention

The present invention relates to an image-inputting apparatus.

2. Description of the Related Art

An image-inputting apparatus such as a scanner reads an image as an electronic data. A conventional image-inputting apparatus stores image data on a storage medium such as a memory card removably attached to the apparatus, so that the image data can be displayed on a personal computer or printed on a printer (Japanese Patent Laid-Open No. 2002-10025).

The image-inputting apparatus has a line image sensor that scans the surface of a document to read the image of the document. The thus read image data is formatted in a predetermined file format. Then, the formatted data is stored into a memory means. The file format has compatibility with other equipment such as a personal computer and a printer, so that the memory means can be attached into a personal computer for displaying the image or a printer for printing the image.

However, the conventional image-inputting apparatus have been of the type in which a user specifies a file format of the image data prior to the storage of image data. Therefore, if a user is not familiarized with working with image data, it takes a long time to set a file format before the image data can be stored.

For example, an image-inputting apparatus such as a scanner does not have a file format used in a camera-equipped mobile phone. Therefore, if a user attaches the image storage means into a camera-equipped mobile phone in an attempt to display an image, the image cannot be displayed. In order that the image data can be displayed on the mobile phone, the image data should first be formatted in a file format that can be accepted by a personal computer before storing the image data in the storing means. Then, by using software for converting image data format, the personal computer converts the thus stored data into an image data format that can be accepted by a camera-equipped mobile phone. This takes a long time to convert the data format and is therefore not user-friendly.

SUMMARY OF THE INVENTION

The present invention was made to solve the aforementioned problems.

An object of the invention is to provide an image-inputting apparatus in which information on an image format of an image data stored in a removable storage medium is read, and the thus read image data is automatically converted into another format that can be accepted by other equipment.

An object of the invention is to provide an image-inputting apparatus in which a user is freed from setting the procedure of format conversion so that the image data can be stored into the removable storage medium quickly.

An image inputting apparatus has an image reading device and a storage medium that can be removably loaded into the image reading device, and a controller that causes the storage medium to store image data read through the image reading device. The apparatus includes an image analyzing section that analyzes image format information previously stored in the storage medium. A data converting section that converts the image data read through the image reading device, conversion being performed based on an analysis result of the image analyzing section. The controller causes the storage medium to store the image data read through the image reading device.

The image format information includes a file format.
The image format information includes the number of colors.
The image format information includes the size of image.
The image format information includes a type of primary colors.
The controller causes the storage medium to store the analysis result as an exclusive file for image format information.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 2 is a block diagram illustrating the configuration of the scanner according to the first embodiment;

DETAILED DESCRIPTION OF THE INVENTION

First Embodiment

{Overall Construction}

Figure 1A:
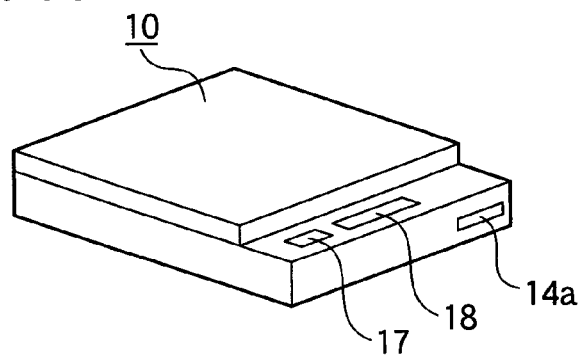
FIGS. 1A is a perspective view of a scanner according to a first embodiment to which a removable memory card is attached.

FIG. 1A is a perspective view of a scanner to which a removable memory card is attached.

Figure 1B:
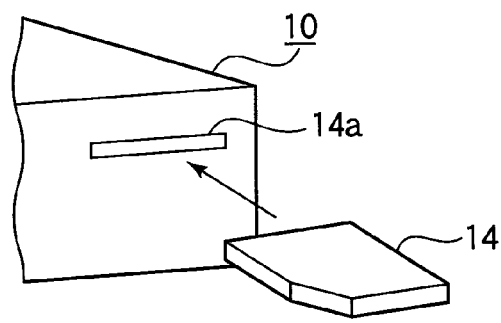
FIG. 1B is an enlarged perspective view of the memory card that is about to be attached to the scanner.

FIG. 1B is an enlarged perspective view of the memory card that is about to be attached to the scanner.

Figure 1C:
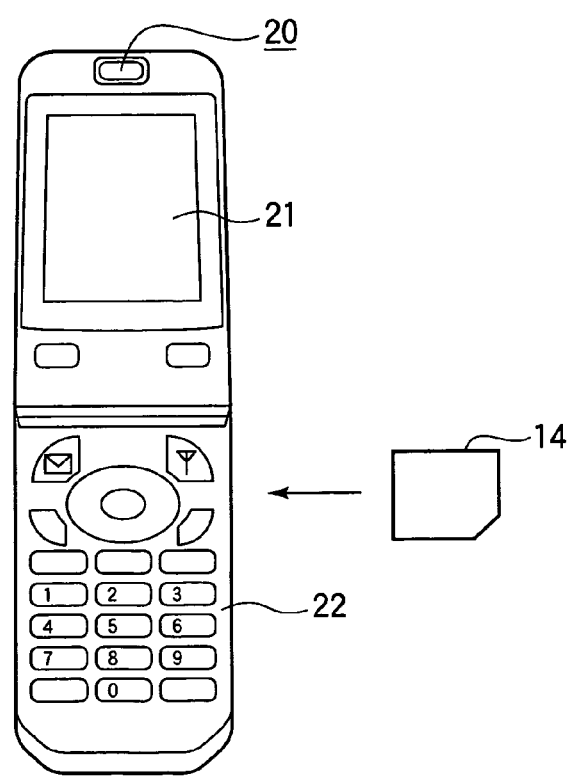
FIG. 1C is a perspective view of a camera-equipped mobile phone.

FIG. 1C is a perspective view of a camera-equipped mobile phone.

Referring to FIGS. 1A-1C, a scanner 10 reads an image thereinto. A camera-equipped mobile phone 20 displays an image data read into the scanner 10. While the camera-equipped mobile phone 20 can also function as an image-inputting apparatus, the present invention will be described with respect to the camera-equipped mobile phone 20 as an apparatus that uses images read in the scanner 10.

The scanner 10 includes an image sensor such as a CCD (Charge Coupled Device), a lens, a medium such as paper on which an image is printed, and a lamp that illuminates a document such as a photograph. The scanner 10 may be of any type including a sheet feeder scanner, a handy scanner, and a drum scanner. For convenience of explanation, the first embodiment will be described with respect to a flat bed scanner. The flat bed scanner uses an image sensor 11 of the intimate contact type. A document is placed on a glass plate and the image sensor 11 is moved relative to the glass plate in an advance direction to read the image on the document. If the scanner 10 has an ADF (Automatic Document Feeder), the image sensor is at a fixed position and the document is transported, thereby reading the image on the document. The scanner 10 is preferably of the type that can read a color document but may be of the type that can read only a monochrome document.

As shown in FIG. 1A, the scanner 10 includes push buttons including a start button; an operating panel 17 in the form of, for example, a touch panel; and a display 18 in the form of a liquid crystal display or an LED display. As shown in FIG. 1B, the scanner 10 is formed with a card slot through which a memory card 14 as a removable memory is inserted in a direction shown by arrow A. The removable storage medium can be of any type of storage medium, for example, a magnetic tape, magnetic disc, magnetic drum, CD-R/W, MD, DVD-RAM, DVD-R/W, optical disk, MO, optical card, and rod memory. The present embodiment will be described with respect to the memory card 14 as the removable storage medium. The memory card 14 according to the present embodiment takes the form of a compact flash memory but can be of any type, provided that the memory means is a non-volatile built-in memory.

The camera-equipped mobile phone 20 includes an operation device such as a processor, storage device, display 21, voice outputting means such as a speaker, voice inputting means such as a microphone, an operating panel 22, communication devices such as a communication interface, lens, and image pickup element such as CCD. The display 21 takes the form of, for example, a liquid display or an LED display. The operating panel 22 includes a key board, joy stick, cross keys, pushbuttons, a remote controller, and a touch panel. The communication devices include primarily a communication interface and an antenna. The camera-equipped mobile phone 20 has a card slot through which the memory card 14 is inserted into the camera-equipped mobile phone 20 in the A direction. The camera-equipped mobile phone 20 is capable of reading the image data from the memory card 14 and displaying the image data on the display 21. The display 21 is preferably a color display but may be a monochrome display.

{Configuration of Scanner}

The configuration of the scanner 10 will be described in detail.

FIG. 2 is a block diagram illustrating the configuration of a scanner according to a first embodiment.

Referring to FIG. 2, the scanner 10 includes an the image sensor 11, a RAM 12, an image processing LSI 13, the memory card 14, an ROM 15, a CPU 16, an operating panel 17, and a display 18. The image sensor 11 reads an image and converts the image into an electrical signal. The RAM 12 is a semiconductor memory that stores primarily image data. The image processing LSI 13 serves as a data converting means. The memory card 14 serves as a removable storage means. The ROM 15 is a semiconductor memory that stores primarily programs. The CPU 16 performs overall control of the scanner 10. The user operates the operating panel 17 to initiate and stop a scanning operation. The display 18 displays the various states of the scanner 10. The image sensor 11, RAN 12, image-processing LSI 13, memory card 14, ROM 15, CPU 16, operating pane 17 and display 18 are connected through a bus 19 so that they can communicate with one another.

The RAM 12 has a capacity that stores image data for at least more than one page that is read by the image sensor 11. The image processing LSI 13 performs compression and conversion of image data stored in the RAM 12. The CPU 16 executes instructions in the programs stored in the ROM 15 to control various operations. The operations includes writing image data into and reading image data from the memory card 14, reading the output of the intimate contact image sensor 11, writing image data into and reading image data from the RAM 12, and controlling the LSI 13 to compress and convert image data. The CPU 16 functions as a data analyzing means that analyzes the data format of the image data stored in the memory card 14.

Image data is formatted in a variety of standardized file formats including JPEG (Joint Photographic Expert Group) and TIFF (Tag Image File Format). There are additional many file formats and it is practically impossible for the scanner 10 to support all the file formats. In the present embodiment, the scanner 10 is designed to accept a plurality of predetermined file formats so that the image processing LSI 13 can convert the image data into one of the plurality of selected file formats.

{Operation of Scanner}

The operation of the scanner 10 will be described. The CPU 16 analyzes the data format of image data in an image file stored in the memory card 14. Then the CPU 16 determines the file format, the number of colors, the size of image, and type of primary colors (RGB or YMC) before the image data read from the image sensor 11 is stored into the memory card 14. It is assumed that the image data taken with the camera-equipped mobile phone 20 has been previously stored as an image file in the memory card 14.

Figure 3:
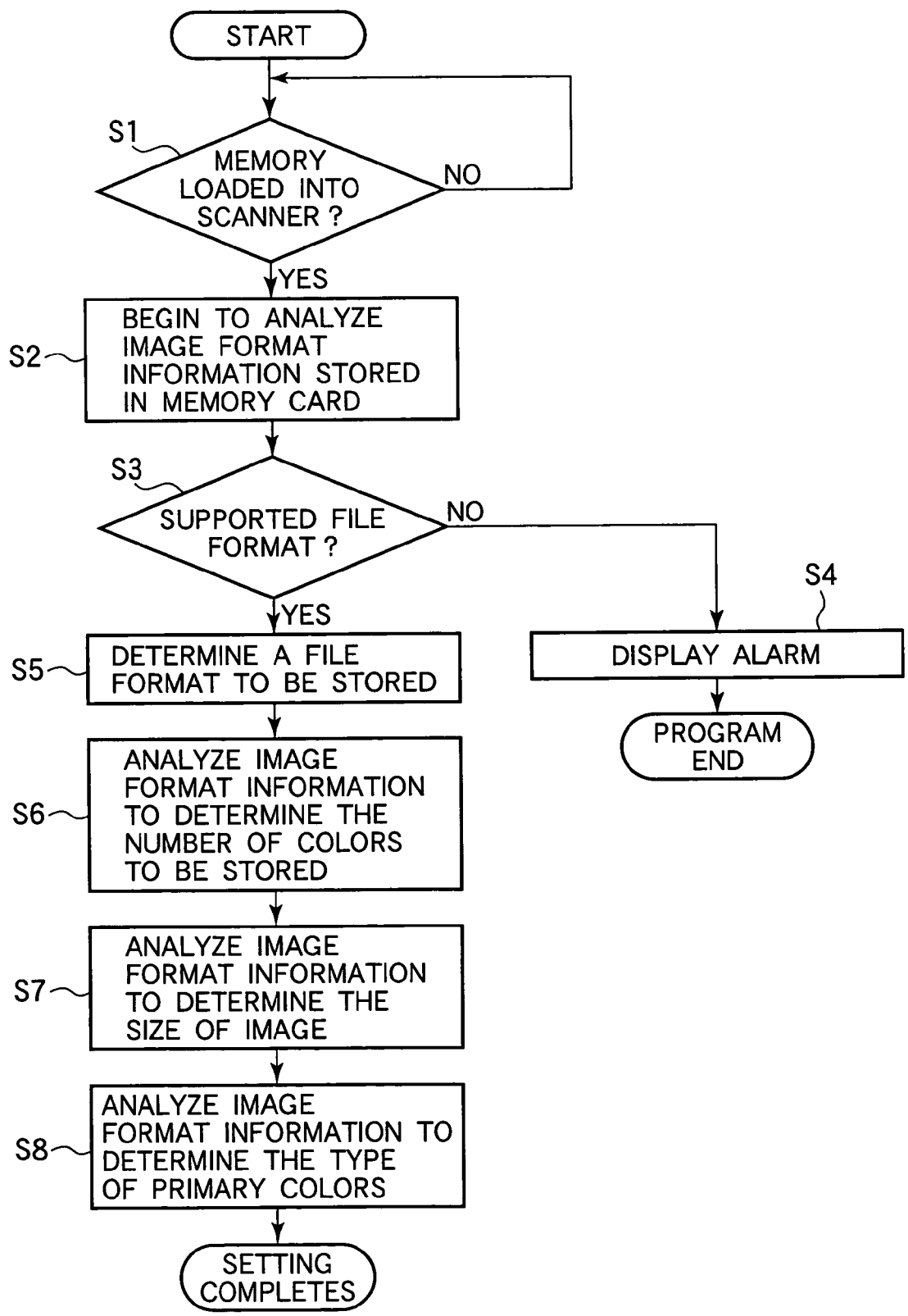
FIG. 3 is a flowchart illustrating the operation of setting the scanner according to the first embodiment.

FIG. 3 is a flowchart illustrating the operation of setting the scanner according to the first embodiment.

The CPU 16 checks whether the memory card 14 has been loaded into the scanner 10. If it is determined that the memory card 14 has been loaded, the CPU 16 initiates analysis of the image format information of image data stored in the memory card 14. The CPU 16 repeats the aforementioned operation until the memory card 14 has been loaded into the scanner.

The CPU 16 checks whether the memory card 14 stores an image data of the same file format as one of those in the scanner 10. If the memory card 14 stores an image data in a file format different from those in the scanner 10, then CPU 16 causes the display 18 to display an alarm and the program ends.

If the memory card 14 stores an image data of the same file format as one of those in the scanner 10, the CPU 16 converts the image data read from the intimate contact image sensor 11 into the same file format as that of the memory card 14. Thus, the image data can be stored into the memory card 14. For example, if the scanner 10 accepts the JPEG format, then the image data that is read through the intimate contact image sensor 11 is stored in the JPEG format.

The CPU 16 further analyzes the information on the file format stored in the memory card 14 to determine the number of colors that can be used. On the basis of the analysis of the further file format, the CPU 16 determines the number of colors that are stored into the memory card 14 together with the image data read with the image sensor 11. If the image format information on the an image file stored in the memory card 14 contains 8-bit color information (i.e., 256 colors), the image data read via the image sensor 11 is stored with 8-bit color information (i.e., 256 colors). Usually, the number of colors of image data is one-bit color (white and black), 4-bit colors (16 colors), 8-bit colors (256 colors), 16-bit colors (656 colors), and 24-bit colors (16,777,216 colors).

The CPU 16 further analyzes the image format information on the image file stored in the memory card 14 to determine the size of the image. Based on the image size, the CPU determines the size of the image that is to be stored into the memory card 14, the image being read through the image sensor 11. If, for example, the image size of the image file stored in the memory card 14 is, for example, 640×480 pixels, then the image data read through the image sensor 11 is converted into a size of 640×480 pixels before it is stored into the memory card 14.

The CPU 16 further analyzes the image format information on the image file stored in the memory card 14 to determine the type of three primary colors, i.e., RGB (Red, Green, Blue) or YMC (Yellow, Magenta, Cyan). Based in the image format information, the CPU 16 us determines the type of three primary colors for the image data read through the image sensor 11 before storing the image data into the memory card 14. If the three primary colors are RGB, then the image data in RGB is stored into the memory card 14.

As described above, the CPU 16 analyzes the image format information on an image file stored in the memory card 14 and determines the following specific items based on the image format information. The items includes the number of colors, the size of image, and the type of three primary colors of image data that is to be stored into the memory card 14. A specific example of the image data to be stored in the memory card 14 is in a JPEG format and has 8-bit colors (256 colors), a 640×480 pixels size, and the type of three primary color in RGB.

FIG. 3 is a flowchart illustrating the operation of the CPU 16. The flowchart will be described.

Step S1: A check is made to determine whether the memory card 14 has been loaded into the scanner 10. If YES, then the program proceeds to step S2. If NO, the program waits until the memory scanner 14 has been loaded into the scanner 10.

Step S2: The CPU 16 begins to analyze the image format information on the image data stored in the memory card 14.

Step S3: A check is made to determine whether the scanner 10 supports the file format of the memory card 14. If YES, then the program proceeds to step S5. If NO, the program proceeds to step S4.

Step S4: An alarm is displayed and the program stops.

Step S5: A file format is determined before storing the image data into the memory card 14.

Step S6: The CPU 16 analyzes the image format information to determine the number of colors to be stored into the memory card 14.

Step S7: The CPU 16 analyzes the image format information to determine the size of image data to be stored into the memory card 14.

Step S8: The CPU 16 analyzes the image format information to determine the type of three primary colors to be stored into the memory card 14.

A description will be given of the operation from when the user places a document on the scanner 10 until the image data read from the document is stored into the memory card 14. It is assumed that the file format, the number of colors, the size of image data, and the type of three primary colors have been set.

Figure 4:
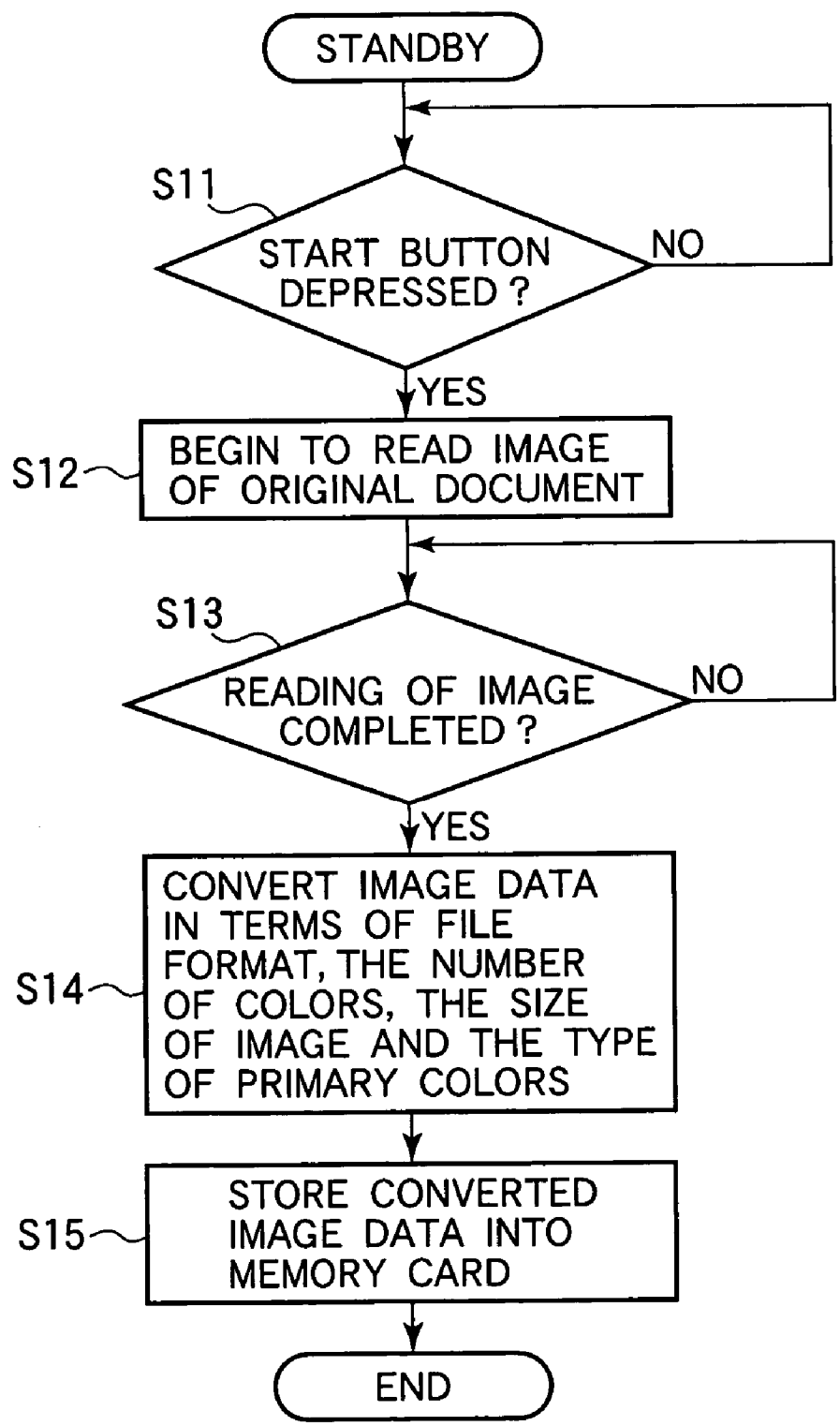
FIG. 4 is a flowchart illustrating the operation in which the image data is stored into the memory card.

FIG. 4 is a flowchart illustrating the operation in which the image data is stored into the memory card 14.

When the scanner 10 is in the standby state, the CPU 16 checks whether the start button on the operating panel 17 has been depressed. If the start button has been depressed, the CPU 16 causes the image sensor 11 to start reading the image of the document. The CPU 16 continues to check whether the start button has been depressed until the start button has been depressed. The image data read through the image sensor 11 is transferred to the RAM 12.

The CPU 16 checks whether the image of the document has been read. Then, when the image of the document has been read, the image processing LSI 13 performs conversion of the image data that is read through the image sensor 11 and stored in the RAM 12. Specifically, the image data is converted in terms of file format, the number of colors, the size of image, and the type of three primary colors. If the image of the document has not been completely read yet, the CPU 16 causes the image sensor 11 to continue to read the image of the document.

Subsequently, the CPU 16 transfers the image data converted by the image-processing LSI 13 to the memory card 14. The image data stored in the memory card 14 is in the JPEG format, and has 8-bit colors (256 colors) in RGB and a size of 640×480 pixels.

When the user pulls out the memory card 14 from the scanner 10 and inserts the memory card 14 into the camera-equipped mobile phone 20, the image of the document appears on the display 21 of the camera-equipped mobile phone 20.

The flowchart will be described as follows:

Step S11: A check is made do determine whether the start button has been depressed. If YES, then the program proceeds to step S12. If NO, the program enters the standby state.

Step S12: The image sensor 11 starts to read the image of the document.

Step S13: A check is made to determine whether the image sensor 11 has read the image of the document completely. If YES, then the program proceeds to step S14. If NO, the image sensor 11 continues to read the image of the document until the image of the document has been completely read.

Step S14: The image processing LSI 13 converts the image data in terms of file format, the number of colors, the size of image, and the type of three primary colors.

Step S15: The converted data is stored into the memory card 14. This completes the processing.

As described above, in the present embodiment, the file format, the number of colors, the size of the image, and the type of three primary colors are automatically determined before the image read by the image sensor 1 of the scanner 10 is stored into the memory card 14. The image format information of an image file stored in the memory card 14 is analyzed to determine the file format, the number of colors, the size of image and the type of three primary colors. The user is freed from having to set the file format, the number of colors, the size of image, and the type of three primary colors before image data is stored into the memory card 14. The user does not have to convert the image data into the file format, the number of colors, the size of image and the type of three primary colors that the camera-equipped mobile phone 20 can accept. Thus, the image data can be stored into the memory card 14 quickly.

Second Embodiment

Elements similar to those in the first embodiment have been given the similar reference numerals and the description thereof is omitted.

A second embodiment will be described with respect to an operation in which the result of analysis of the image format information on an image file is stored as an exclusive file for image format information into the memory card 14. Specifically, a check is made to determine whether an exclusive file for image format information exists into the memory card 14. If YES, then the program refers to the content of the exclusive file for image format information to obtain the image format information from the content of the exclusive file for image format information.

For example, assume that the file name of the exclusive file for image format information on an image file is CONF.SYY. Then, the image format information can be created by converting the format of contents in the exclusive file for image format information into the text format that can be written in a few bytes as follows:

$$\text{FILE}=JPG, \text{COLOR}=256, \text{SIZE}=640\times480,$$
$$\text{COLORMIX}=RGB \quad \text{Ex}(1)$$

where FILE is :a string of characters that specifies a file format, and the right side of "=" is a file format. Here the file format is JPEG. COLOR is a string of characters for specifying the number of colors, and the right side of "=" is the number of colors (here 256 colors). SIZE is a string of characters for specifying the size of image, and the right side of "=" is the size of image (here 640×480 pixels). COLORMIX is a string of characters for specifying the type of three primary colors (here RGB).

{Operation of Scanner}

The operation of the scanner 10 will be described. It is assumed that an image taken with a pickup element of the camera-equipped mobile phone 20 has been stored as an image file in the memory card 14.

Figure 5:
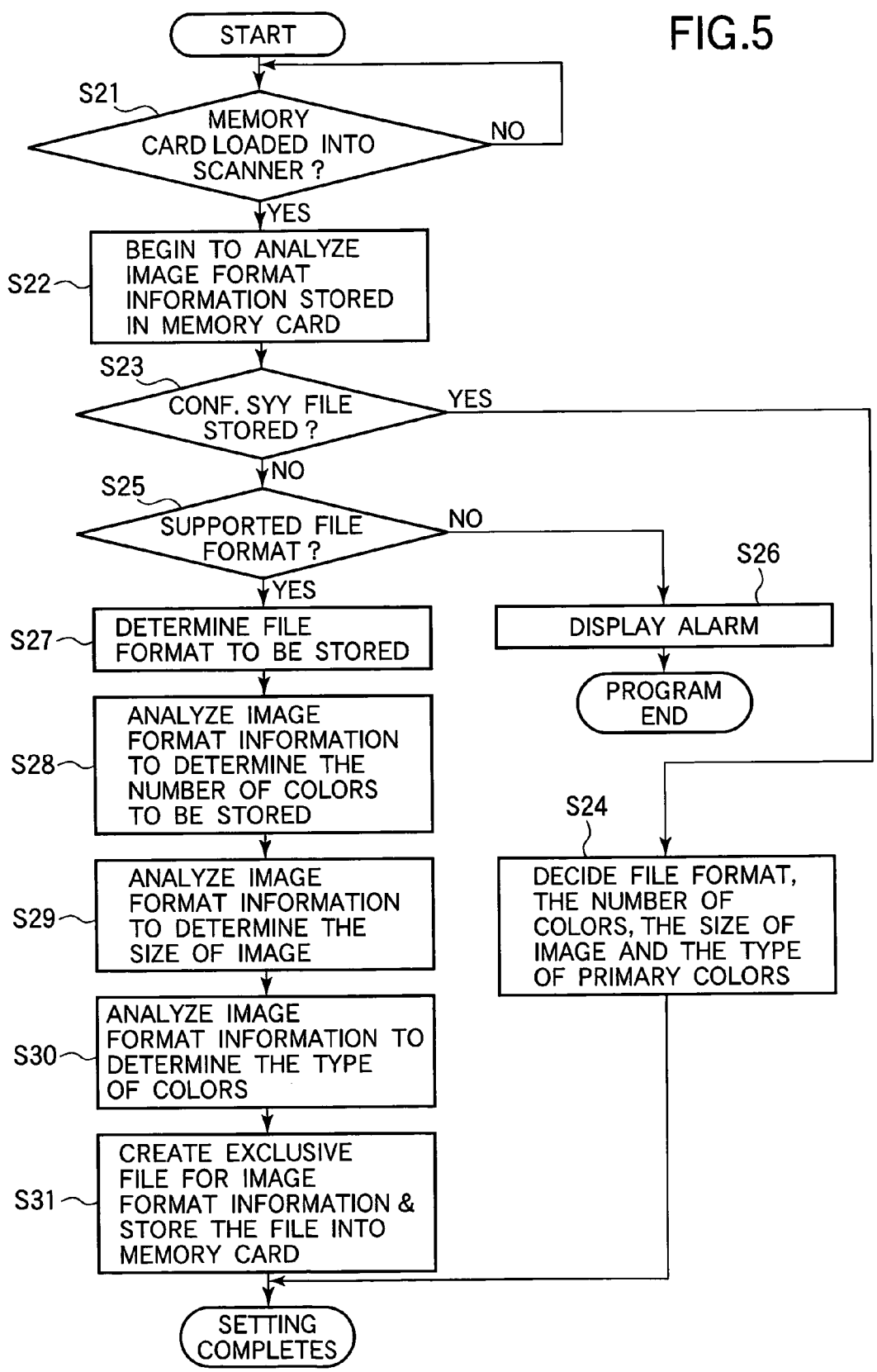
FIG. 5 is a flowchart illustrating the operation when the exclusive file for image format information according to a second embodiment is used.

FIG. 5 is a flowchart illustrating the operation when the exclusive file for image format information according to the second embodiment is used.

The CPU 16 checks whether the memory card 14 has been loaded into the scanner 10. If the memory card 14 has been loaded into the scanner 10, the CPU begins to analyze the image format information on an image file stored in the memory card 14. The CPU 16 continues to check whether the memory card 14 has been loaded, until the memory card 14 has been loaded.

The CPU 16 checks whether a CONF.SYY file is among the files stored in the memory card 14. The CONF.SYY file is an exclusive file for image format information. If the CONF.SYY file exists in the memory card 14, the CPU 16 checks the content of the CONF.SYY file to obtain image format information. This completes the setting of image format. For example, if the contents of the CONF.SYY file are FILE=JPG, COLOR=256, SIZE=640*480, COLORMIX=RGB, the CPU 16 sets the file format to JPEG, the number of colors to 8-bit color (256 colors), the size of image to 640×480 pixels, and the type of three primary colors to RGB.

If the CONF.SYY file is not among the files stored in the memory card 14, then the CPU 16 checks whether the scanner 10 supports the file format of an image file stored in the memory card 14. If the file format of the image file is not supported by the scanner 10, then the CPU 16 displays an alarm on the display 18 and the program ends.

If the scanner 10 supports the file format of the image file, the CPU 16 converts the image read through the image sensor 11 into the same file format as the image file and decides that the image data should be stored into the memory card 14. For example, assume that the scanner 10 supports the JPEG format among other file formats. Then, if the file format of the image file stored in the memory card 14 is also the JPEG format, the image data read through the image sensor 11 is stored in the JPEG format into the memory card 14.

The CPU 16 continues to analyze the image format information on the image file stored in the memory card 14 to determine the number of colors that can be used. Based on the number of colors, the CPU determines the number of colors before storing the image data read through the image sensor 11 into the memory card 14. For example, if the number of colors that can be used is 8-bit colors (256 colors) the number of colors is set to 8-bit colors (256 colors) prior to the storage of the image data into the memory card 14.

The CPU 16 continues to analyze the image format information on the image file stored in the memory card 14 to determine the size of image to be stored into the memory card 14. Based on the size of the image in the memory card 14, the CPU 16 determines the size of image data that is read through the image sensor 11 and stored into the memory card 14. For example, if the image data stored in the memory card 14 has an image size of 640×480 pixels, then the image size of the image to be stored into the memory card 14 is set to 640×480 pixels.

The CPU 16 continues to analyze the image format information on the image file stored in the memory card 14 to determine the type of three primary colors of the image to be stored into the memory card 14. Based on the type of three primary colors of the image stored in the memory card 14, the CPU 16 determines the type of three primary colors of image when the image data read through the image sensor 11 is stored into the memory card 14. For example, if the type of three primary colors of the image data stored in the memory card 14 is RGB, then the type of three primary colors of the image to be stored into the memory card 14 is set to RGB.

The CPU 16 then stores the results of analysis as an exclusive file for image format information by the name of CONF.SYY into the memory card 14. In this case, the contents of the exclusive file for image format information are FILE=JPG, COLOR=256, SIZE=640×480, and COLORMIX=RGB.

Subsequently, the user sets an original document on the scanner 10 so that the scanner reads the image of the document, and the image of the document is stored into the memory card 14. The operation is the same as the first embodiment from when the user places a document on the scanner 10 until the image data read from the document is stored into the memory card 14. Thus, the description thereof is omitted.

In this case, the image data read through the image sensor 11 is converted into the JPEG format, and has 8-bit colors (256 colors) 640×480 pixels, and RGB. Then, the image data is stored into the memory card 14. When the user unloads the memory card 14 from the scanner 10 and loads it into the camera-equipped mobile phone 20, the image of the document is displayed.

The flowchart will be described.

Step S21: A check is made to determine whether the memory card 14 has been loaded into the scanner 10. If YES, then the program proceeds to step S22. If NO, the program waits until the memory card 14 is actually loaded into the scanner 10.

Step S22: the CPU 16 begins to analyze the image format information on an image file stored in the memory card 14.

Step S23: The CPU 16 makes a decision to determine whether a CONF.SYY file is among the files stored in the memory card 14. If YES, the program proceeds to step S24. If NO, the program proceeds to step S25.

Step S24: The CPU 16 refers the content of the CONF.SYY file to obtain the image format information, i.e., FILE=JPG, COLOR=256, SIZE=640*480, and COLORMIX=RGB.

Step S25: The CPU 16 makes a decision to determine whether the scanner 10 supports the file format of an image.

Step S26: The CPU 16 displays an alarm on the display 18 and the program ends.

Step S27: The CPU 16 decides the image format of the image data that should be stored into the memory card 14.

Step S28: The CPU 16 continues to analyze the image format information to determine the number of colors that should be stored.

Step S29: The CPU 16 continues to analyze the image format information to determine the size of image that should be stored.

Step S30: The CPU 16 continues to analyze the image format information to determine the type of three primary colors that should be stored.

Step S31: The CPU 16 creates an exclusive file for image format information and then stores it into the memory card 14.

In the present embodiment, the CPU 16 automatically determines the file format, the number of colors, the size of the image, and the type of three primary colors before storing image data of a document read through the image sensor 11 of the scanner 10 into the memory card 14. The CPU 16 not only determines the file format, the number of colors, the size of the image, and the type of three primary colors, but also creates an exclusive file for image format information based on the analyzed image format information. The analyzed image format information is a configuration file having a small data size of several bytes and is stored into the memory card 14. Thus, Once the configuration file is stored into the memory card 14, the simply referring to the exclusive file for image format information allows determining of the file format, the number of colors, the size of image, and the type of three primary colors. This eliminates the need for storing an image file having a large data size in the memory card 14 in order to set the file format, the number of colors, the size of image and the type of three primary colors. The memory capacity of the memory card 14 can be fully utilized.

The first and second embodiments have been described with respect to the scanner 10 as an image inputting device, the image inputting device can be any type of device provided that the device is capable of inputting an image. The image inputting device includes the camera-equipped mobile phone 20 and a digital still camera.

Modification to Second Embodiment

The aforementioned second embodiment has been described with respect to a case in which the image data stored in the memory card 14 after format conversion is displayed on the display of a device. If the device is capable of identifying various image formats, the second embodiment can be modified as follows.

Figure 6:
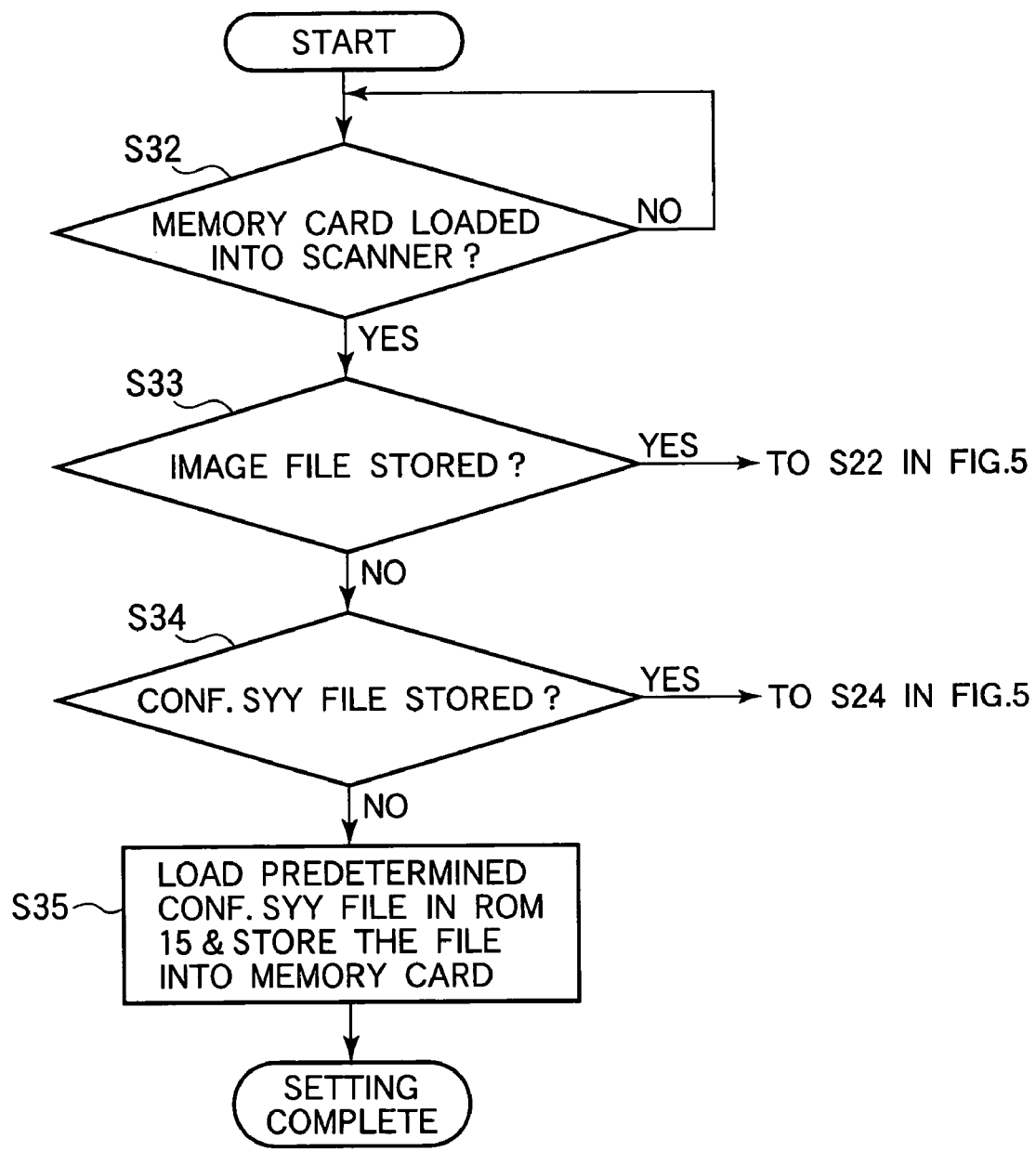
FIG. 6 illustrates a modification to the setting of the scanner of the second embodiment.

FIG. 6 illustrates a modification to the setting of the scanner.

Step S32: A check is made to determine whether the memory card 14 has been loaded into the scanner 10. If YES, the program proceeds to Step S33. If NO, then the program waits until the memory card 14 is loaded into the scanner 10.

Step S33: The CPU 16 makes a decision to determine whether an image file has been stored in the memory card 14. If YES, then the program proceeds to Step S22 of FIG. 5 and the operation onward is the same as the second embodiment. If NO, then the program proceeds to Step S34.

Step S34: The CPU 16 makes a decision to determine whether the CONF.SYY file has been stored in the memory card 14. If YES, the program proceeds to Step S24 and the operation onward is the same as the second embodiment. If NO, the program proceeds to Step S35.

Step S35: The CPU 16 reads an exclusive file from the ROM 15, the file containing image format information required, and stores the file into the memory card 14.

According to the modification, when the memory card 14 has not CONF.SYY file and an image file for an image to be stored into the memory card 14, the image file and exclusive file required for the image are written into the memory card 14. This eliminates the need for analyzing the image file. Therefore, when the memory card 14 is loaded into a device, the device only needs to read the exclusive file from the memory card 14 to determine the format information on the image data. This simplifies the operation performed by the operator.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image inputting apparatus having an image reading device, a storage medium that is capable of storing a plurality of items of image data and can be removably loaded into said image reading device, and a controller that causes the storage medium to store image data read through the image reading device, the apparatus comprising:
a detecting section that determines whether the storage medium has an exclusive file that holds image format information;
a storing section that stores image format information that describes a predetermined image format;
wherein if said detecting section determines that the exclusive file is not present in the storage medium, the controller causes the storage medium to store the image data read through the image reading device and a corresponding exclusive file that holds the image format information on the predetermined image format for the image data read through the image reading device.

2. The apparatus according to claim 1, wherein the image format information includes a file format.

3. The apparatus according to claim 1, wherein the image format information includes the number of colors.

4. The apparatus according to claim 1, wherein the image format information includes the size of image.

5. The apparatus according to claim 1, wherein the image format information includes a type of primary colors.

6. The apparatus according to claim 1, wherein the controller causes the storage medium to store the analysis result as an exclusive image format information.

* * * * *